United States Patent [19]

Normandin

[11] Patent Number: 4,941,725
[45] Date of Patent: Jul. 17, 1990

[54] ALL-OPTICAL PLANAR MODULATOR STRUCTURE WITH CHANNEL WAVEGUIDES

[75] Inventor: Richard J. F. Normandin, Ottawa, Canada

[73] Assignee: Canadian Patents & Development Limited, Ottawa, Canada

[21] Appl. No.: 398,647

[22] Filed: Aug. 25, 1989

Related U.S. Application Data

[63] Continuation-in-part of Ser. No. 228,473, Aug. 5, 1988, Pat. No. 4,867,515.

[51] Int. Cl.[5] ............................................... G02B 6/10
[52] U.S. Cl. ................................... 350/96.13; 350/354
[58] Field of Search .............. 350/96.13, 96.14, 96.15, 350/354, 355

[56] References Cited

U.S. PATENT DOCUMENTS

| | | | |
|---|---|---|---|
| 4,626,075 | 12/1986 | Chemla | 350/354 |
| 4,693,547 | 9/1987 | Soref et al. | 350/96.13 |
| 4,716,449 | 12/1987 | Miller | 350/354 |
| 4,867,515 | 9/1989 | Normandin | 350/96.13 |

*Primary Examiner*—William L. Sikes
*Assistant Examiner*—John Ngo
*Attorney, Agent, or Firm*—Yoshiharu Toyooka

[57] ABSTRACT

All optical modulators are disclosed which include a channel waveguide made of an optically nonlinear material and transmitting an infrared beam. A control light whose wavelength is shorter than the bandgap energy of the channel of the guide is directed to the guide to bring it to cutoff. Near 100% modulation was obtained for a silicon waveguide with less than 150 pJ with a subnanosecond initiation and recovery time in a three port, fiber optics, geometry suitable for use as a logic gate. The operation is largely wavelength independent and stable. Planar multiple optical modulator structures are also disclosed as further embodiments.

9 Claims, 8 Drawing Sheets

LEGEND

▨ ETCHED REGION
⊗ PHOTODETECTOR
━━▶ POLYIMIDE CONTROL GUIDE
═══▶ SILICON WAVE GUIDE
≈≈≈ SPLITTER GRATINGS IN SILICON
↓
≈≈≈▶ INTERACTION/DEFLECTION GRATINGS
↙↘ TOTAL INTERNAL REFLECTION
∕↓ ∕↓ HALF MIRROR

ALL-OPTICAL PLANAR MODULATOR STRUCTURE WITH CHANNEL WAVEGUIDES

This is a continuation-in-part application of application Ser. No. 07/228,473 filed on Aug. 5, 1988, now U.S. Pat. No. 4,867,51 by the present inventor.

FIELD OF THE INVENTION

The present invention relates to fiber optic modulators and in particular to all-optical integrated fiber optic modulators which include a channel waveguide.

BACKGROUND OF THE INVENTION

Advances in optically nonlinear materials and single mode fiber technology have led to a renewed interest in integrated optics. For coherent communication fiber systems, integrated optics offers the possibility of an entirely monolithic implementation of narrow linewidth lasers, modulators, detectors, frequency shifters and optical switches. With III-V semiconductors optical functions and associated electronics for drivers and detectors can be on the same optoelectronic chip. Recent advances in nonlinear integrated optics also hold promises for applications in all-optical processing and interfacing of fiber signals. Power dependent nonlinear couplers, nonlinear distributed feedback gratings, optically tunable filters, bistable integrated gratings and logic gates are all possible applications of integrated optics in communication systems resulting from a better understanding of nonlinear guided mode behaviour. New organic (such as liquid crystals) or semiconductor materials (e.g. MQW: multiple quantum wells) in an integrated optics context may provide the properties needed to make all-optical processing viable in the next generation devices.

Several nonlinear switches using bistable devices, some to be used as logic gates, have been demonstrated in the past. Their use for the elimination of conversions between electrical and optical signals in fiber optic communications systems is of great interest and is driving research in novel nonlinear materials. To date, most of the devices demonstrated are based on highly engineered materials and are, unfortunately, also wavelength and temperature sensitive. Silicon has been popular in the past as a substrate for other types of optical waveguides but was largely neglected as the guiding medium itself, apart from some early work at 10.6 $\mu$m. Soref and Lorenzo (J. of Quantum Electronics QE-22, p. 873, 1986) recently demonstrated multimode silicon waveguides for use in the near infrared at wavelengths of use in long distance fiber optics and although they mentioned the possibility of optically controlling the waveguide properties, they have concentrated on the electrooptical aspects. They also pointed out several advantages in using silicon for integrated optics. In the present inventor's U.S. Pat. No. 4,776,658 issued Oct. 11, 1988, fiber optic modulators are disclosed in which an optically nonlinear material, e.g. silicon, is provided between a pair of single mode fiber optics defining a fiber-to-fiber mode coupling having a predetermined coupling factor. A control light from a control fiber optic modifies the coupling factor of the nonlinear material, thus modulating the transmission of the carrier light. However, the non-linear material used therein does not form a waveguide. Furthermore, the operating principles are entirely different from those described here.

OBJECTS OF THE INVENTION

It is therefore an object of the present invention to provide all optical modulators which include channel waveguides.

It is another object of the present invention to provide an optic modulator in which the guiding cutoff conditions are disturbed by a control light thus modulating the transmission of light.

It is still another object of the present invention to provide an optic modulator in which the channel waveguide is formed by doping appropriately with dopants.

It is still another object of the present invention to provide an all planar structure for the monolithic integration of an array of said modulators and logic gates to form an optical integrated in unit.

SUMMARY OF THE INVENTION

Briefly stated, an optical modulator according to the present invention comprises a channel waveguide which have a substrate and a channel provided on the said substrate. The channel has the refractive index higher than that of the substrate and is provided with two ends for transmitting therethrough under a guiding condition a light having a wavelength longer than the bandgap energy of the said channel. An input fiber optic is optically coupled to one of the two ends of the channel for sending the light into it, and an output fiber optic is also optically coupled to the other of the two ends for receiving the light therefrom. A control fiber optic is optically coupled to the channel between the two ends for sending a control light having the wavelength shorter than the bandgap energy of the channel so that the control light lowers the effective refractive index of the channel to a cutoff level to disturb the guiding condition.

BRIEF DESCRIPTION OF THE DRAWINGS

For a more complete understanding of the present invention and for further objects and advantages thereof, references may now be made to the following description taken in conjunction with the accompanying drawings in which.

DETAILED DESCRIPTION OF THE PREFERRED EMBODIMENTS

Figure 1:
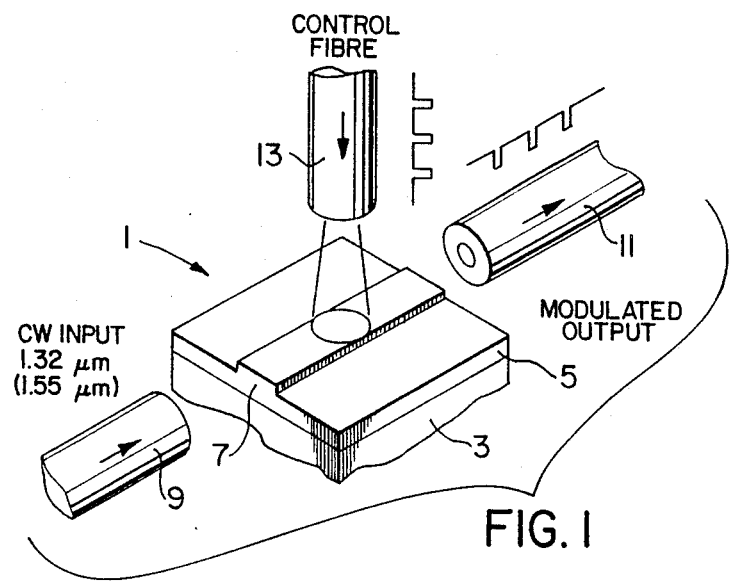
FIG. 1 is a schematic illustration of an all-optical modulator according to one embodiment of the invention.

FIG. 1 is a schematic illustration of an all optical modulator according to an embodiment of the present invention. A channel waveguide 1 is made of silicon substrate 3 and a channel layer 5, a part of which has the thickness larger than the remaining part and forms a channel 7. It is of course possible to provide a channel on the substrate without the channel layer. An input fiber optic 9 is a single mode fiber carrying an input light of infrared wavelengths, e.g. 1.32 μm, 1.55 μm, etc. An output fiber optic 11 is also a single mode fiber carrying the modulated output light. A modulation fiber optic 13 is a fiber carrying a modulation light of shorter wavelength than the bandgap energy of the material of the channel. The modulation light is directed in this embodiment perpendicularly to the channel between the two ends thereof. In the embodiment a single mode slab waveguide was first made; an antimony doped silicon wafer (carrier density, n-type, $N_2 = 3 \times 10^{18}$ $cm^{-3}$) was used as substrate on which was provided a standard MBE growth of 6.8 μm lightly doped (carrier density $N_1 = 10^{15}$ $cm^{-3}$) epitaxial layer for the layer 5. The wafer was then cleaved to obtain sharp 90° facets suitable for edge coupling of the fibers. The channel 7 was formed by etching parts of the channel layer.

The channel waveguide confines light coupled from the input single mode fiber optic at 1.32 or 1.55 μm in the lightly doped silicon channel. The control fiber optic carries the modulation pulses (of shorter wavelength than the bandgap energy of the channel) which create electron-hole pairs and thus lower the effective index of the channel waveguide to such an extent as to reach the cutoff condition and eliminate transmission through the system.

Since the modulator needs to be only a few hundreds micrometers in total length the intrinsic guide losses are unimportant. One of the major losses being due to Fresnel losses at the interfaces, antireflection coatings on the input and output faces minimize these to 3–4 dB loss. The mode mismatch between the fiber and asymmetric guide also contributes to the insertion loss but without much optimization, the total insertion losses were ranging from 5 to 15 dB depending on coatings and channel quality. Up to 100 mW at 1.32 μm was coupled to the waveguides without any thermal problems for propagation lengths of about 1 mm.

In the experimental setups, a semiconductor laser supplied 0.5 mW of CW 1.55 μm light or, alternatively, a CW Nd-YAG laser generated light at 1.32 μm for the input fiber optic 9 to the waveguide 1. The light was coupled to the single mode fibers with commercial high precision couplers in order to achieve well characterized and reproducible coupling efficiencies. Light pulses for the modulation fiber optic were generated by a gaussian-gaussian (temporal and spatial profile) characteristics at 1.06 μm and 0.53 μm. A dye laser was used to generate 0.80 μm and doubled for the 0.4 μm measurements. The fibers used were of standard step-index design with an 8 μm core, a numerical aperture of 0.12 and single mode at 1.32 μm.

Theoretical treatments of the present invention are now given below.

The absorption of the modulation light in the waveguide creates electron-hole pairs via indirect interband absorption and effectively lowers the waveguide's index of refraction at the guided light wavelength. This effect is used to bring the waveguide to cutoff or used to change the phase of the guided light.

Figure 2:
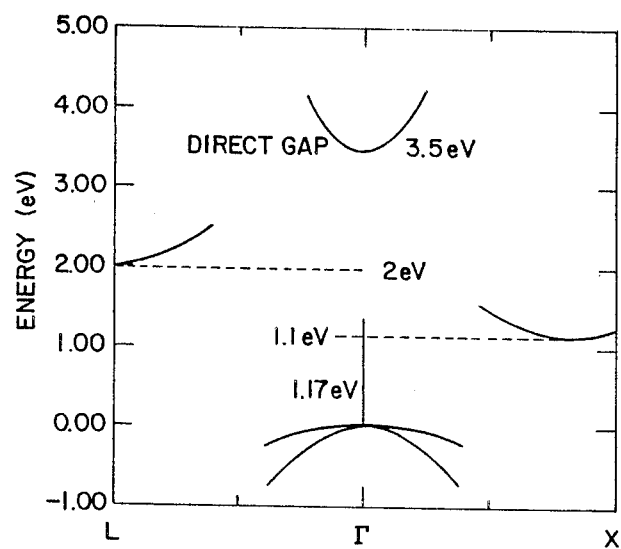
FIG. 2 is a chart showing the silicon band structure.

Although the following calculation is given for silicon the same idea can be demonstrated for liquid crystals, GaAs, MQW's, InSb and many other nonlinear materials. Full mode calculations with overlap integral approach were performed but the basic idea is better understood with the simple cutoff derivation that will be explained below. The difference in estimated energies is not significant. The creation of electron-hole pairs by light or the presence of free carriers due to impurities or intentional doping results in a modification of the refractive index in semiconductors. The exact dynamics of these free carriers are dependent on the particular materials and thus the approximations used here will only apply to the case of silicon at room temperature for low to moderate light intensities and doping levels. Because of its indirect bandgap, as outlined in FIG. 2, silicon is relatively transparent even for light close to the bandgap energy (linear absorption coefficient $\alpha = 10$ $cm^{-1}$ at wavelength $\lambda = 1.06$ μm for low intensities). For longer wavelengths the losses are even lower ($\alpha = 10^{-3}$ $cm^{-1}$ at $\lambda = 1.32$ μm). Thus silicon is a suitable low loss material for use in waveguiding geometries at wavelengths over one micrometer. In FIG. 2 it is shown that for a wavelength shorter than approximately 1 μm light will be absorbed resulting in the creation of electron-hole pairs. Other materials, such as GaAs, have different band diagrams and although the numbers are different, the creation of electron-hole pairs or excitons (for MQW) or molecular reorientation (liquid crystals) all result in a net reduction of index of refraction to bring a waveguide made of these materials to cut-off conditions.

The change in index of refraction for the guided light due to electron-hole creation in the waveguide may be estimated (for absorption depth longer or comparable to the guide thickness) as $$\Delta n_g = - \frac{e^2 \sqrt{\pi}}{8\epsilon_o h \pi^2 c^3} \cdot \frac{\tau}{m_{eh}} \cdot \frac{\alpha m \lambda_g^2 \lambda m}{n_g} \cdot I_o$$

for a gaussian pulse in time given by $$I = I_o \exp -\frac{t^2}{\tau}$$

where the subscript m refers to the modulation light, above bandgap energy, and the subscript g to the guided light, and further $I_o$ is the peak intensity, $\tau$ the gaussian time duration, $\alpha_m$ the linear absorption coefficient, c the speed of light in vacuum, $m_{eh}$ the effective mass of an electron-hole plasma, $n_g$ the refractive index for the guided light, $\lambda_g$ and $\lambda_m$ the wavelength in vacuum of the guided and modulation light respectively, e the electronic charge, $\epsilon_o$ the free space permitivity, and h Planck's constant.

The change in index due to the substrate doping at the guided wavelength is given by $$\Delta n_g = (N_2 - N_1) \frac{e^2(\lambda_g)^2}{8\pi^2 c^2 n_{g\,o} m_e}$$

where $m_e$ is the effective mass of the dopant carrier, $N_1$ and $N_2$ are the carrier densities in the channel (channel layer) and the substrate respectively. Thus if the two previous equations are set equal, the required intensity to bring the waveguide to cutoff can be estimated.

$$I_o = (N_2 - N_1) \frac{h\, c\, m_{eh}}{\sqrt{\pi}\ \tau \alpha_m \lambda_m m_e}$$

Taking the cutoff condition for minimum guide effective thickness into account, $$n_c = \frac{(\lambda_g)^2}{32 n_g t_g^2}$$

modifies the previous calculation slightly, $$I_o = \frac{\epsilon_o h \pi^2 c^2 m_{eh}}{e^2 \sqrt{\pi}\ \tau \alpha_m \lambda_m} \left( \frac{e^2(N_2 - N_1)}{\pi^2 c^2 \epsilon_o^2 m_e} - \frac{1}{4 t_g^2} \right)$$

where $t_g$ is the guide effective thickness.

Figure 3:
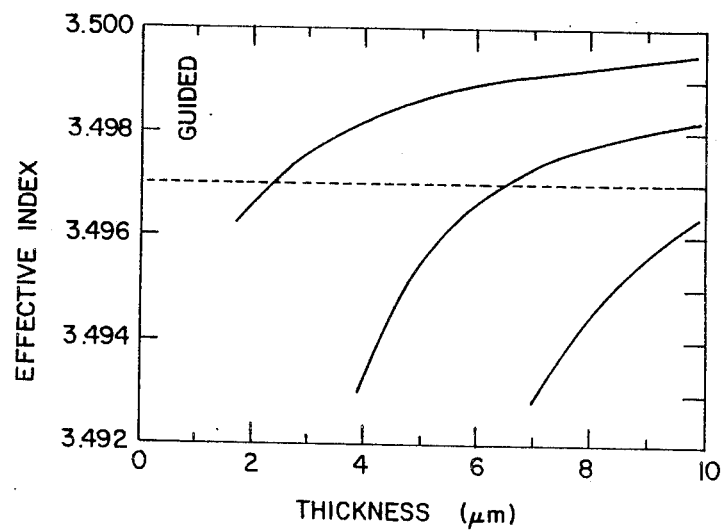
FIG. 3 is a graph showing the effective mode index relative to guide thickness for the case of the silicon example.

FIG. 3 shows the effective mode index relative to guide thickness at 1.32 μm and with a substrate doping of $3 \times 10^{18}$ cm$^{-3}$ (n-type) for silicon. The guided modes are in the top portion only above the dotted line. While n-type dopants such as P, As and Sb were mainly considered, p-type dopants, e.g. B, can also be used.

A comparison between this simple theory and the experimental measurements shows a fairly accurate agreement except for 0.4 μm modulation light as will be discussed later.

For short wavelength modulation the absorption length can be much shorter than the waveguide thickness. At $\lambda_m = 0.4$ μm, for example, the linear absorption coefficient is about $3 \times 10^4$ cm$^{-1}$ resulting in a penetration depth of less than 300 nm. Therefore carrier diffusion dynamics in the guide region is the dominant mechanism in creating a time dependent index of refraction profile resulting in an index gradient inside the otherwise uniform guide. The waveguiding properties were analyzed using a WKB approach and the index profile computed for each "time frame" as the plume of electron-hole pairs diffused in the guide. The diffusion model was derived from a 2D carrier profile following McKelvey in "Solid State and Semiconductor Physics" Harper and Row, p. 341, (1966).

$$N(x,t) = \frac{\alpha_m \lambda_m e^{-\alpha_m x} I_o}{2hc} \int_{-\infty}^{0} \exp\left\{ D\gamma \alpha_m^2 - \left(\frac{t'}{\tau}\right)^2 \right\} \mathrm{erfc}\left\{ \frac{2 D\gamma \alpha_m - x}{2\sqrt{D\gamma}} \right\} dt'$$

where D is the ambipolar diffusion coefficient, and erfc is the complementary error function, and $\lambda = (t - t')$. As will be discussed later good agreement with experimental values was obtained using this model without any adjustable parameters for all cases and 0.4 μm modulation energies in particular.

By employing equations, it is possible to choose an appropriate doping level to maintain close coupling with a given fiber core diameter. This is done by varying the substrate doping to obtain single mode operation at a given waveguide thickness. This point was not appreciated in previous works. The dispersion relation for the asymmetric guide was then solved using the usual techniques and the results for the effective TE mode propagation index are shown in FIG. 3. Single mode operation was achieved for thicknesses ranging from 4 to 7 μm with a n-type substrate doped to $3 \times 10^{18}$ cm$^{-3}$. This is very close to core diameter of 8 μm of the 1.32 μm single mode fibers used in the present embodiment.

Figure 4A:
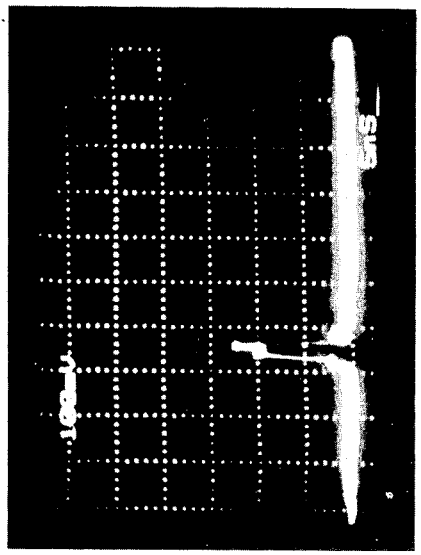
FIGS. 4a, 4b; 5a, 5b; 6a and 6b are photographs showing control lights and responses of the modulators of the present invention.
Figure 4B:
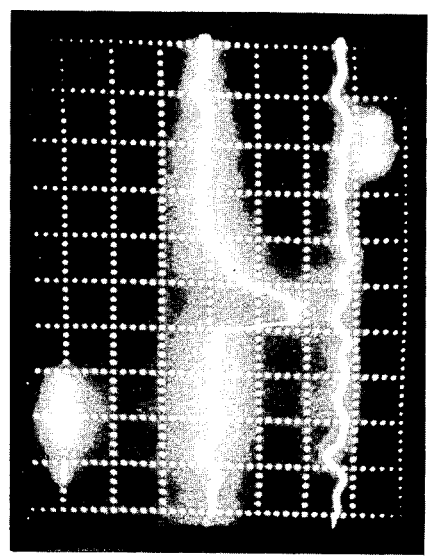
Figure 5A:
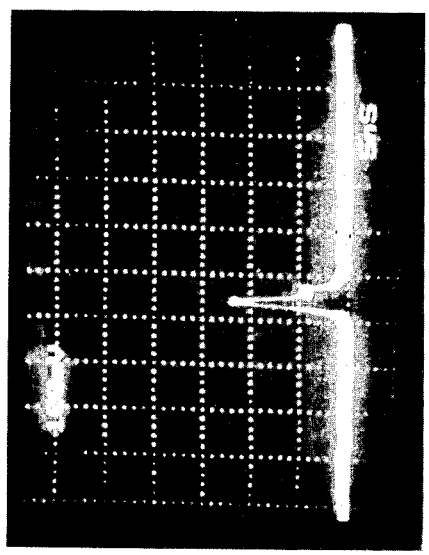
Figure 5B:
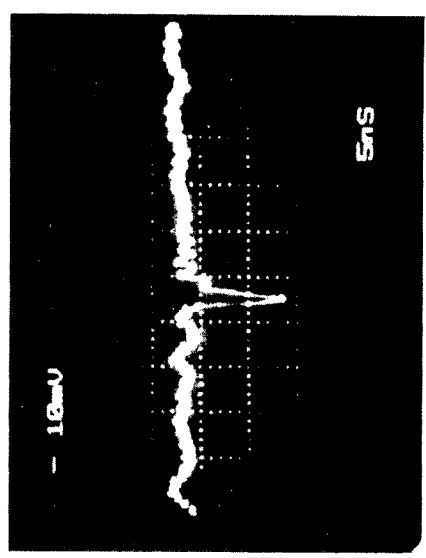
Figure 6A:
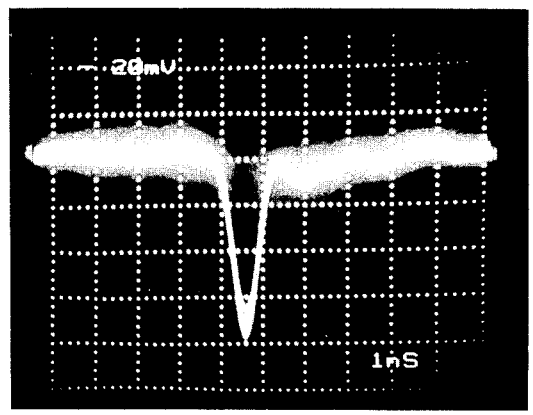
Figure 6B:
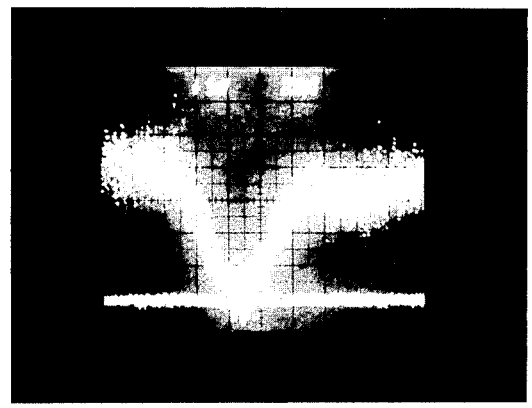

In actual experiments, a typical modular response at 1.32 μm is shown in FIG. 4b with a control pulse of 150 pJ of energy at 0.4 μm on the modulation fiber optic which is presented in FIG. 4a. As expected, the initiation time follows the control pulse and the recovery time is consistent with ambipolar diffusion of the electron-hole pairs out of the 6.8 μm guide. The first one was increased by diffusing in 5 nm of gold deposited on the back surface of the wafer at 1000° C. for 10 min. A hydrofluoric acid dip was then used to remove any oxide on the surfaces. Since gold is a very efficient recombination center, the carrier lifetime can be reduced from microseconds to a few hundred of picoseconds. This was then verified as shown in FIG. 5a for 150 pJ of 0.4 μm control light and near 100% modulation depth as evidenced in the response shown in FIG. 5b. Rise and fall times now followed the input laser pulse accurately. Using 80 ps light pulses at 0.53 μm from a CW mode locked Nd-YAG laser with a repetition rate of 76 MHz yielded the results presented in FIGS. 6a and 6b. The rise and fall times are limited in the measurement of FIG. 6a showing a control pulse of 500 MHz bandwidth of a R7912 transient digitizer used in the experiment. In an attempt to rectify the problem, a homemade InGaAs photodiode was modified to achieve speeds in the 300 ps range. The results, using a sampling oscilloscope, are displayed in FIG. 6b showing modulation response for 100% modulation with 370 pJ driving energy. The modulation wavelength was systematically changed and the energy required measured: at 1.06 μm, 10 nJ was predicted and 17 nJ was measured; similarly at 0.80 μm it was 311 pJ (predicted) and 360 nJ (measured); at 0.53 μm, it was 327 vs 350 pJ; and finally, at 0.40 μm, 10 pJ was predicted by the simple model and 150 pJ was measured. The 2D diffusion driven model, however, gave 110 pJ which compares well with the measured 150 pJ at 0.4 μm.

Figure 7:
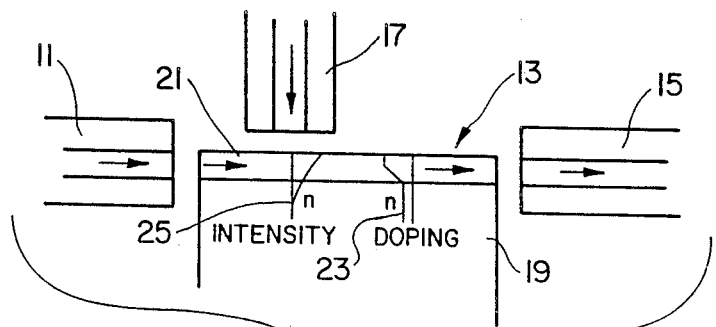
FIG. 7 is a schematic and partly graphic illustration of an optic modulator according to another embodiment of the present invention, using a graded doping profile.

Referring to FIG. 7, another embodiment to speed up the response of the invention is illustrated. In the Figure, an input fiber optic 11 sends a light of wavelength $\lambda = 1.32$ μm into a channel waveguide 13 and an output fiber optic 15 receives the modulated light. A modulation fiber optic 17 is located perpendicularly to the waveguide 13 and sends a control light into it. The waveguide 13 includes a silicon substrate 19 doped with P to $N_2 \sim 10^{18}$ cm$^{-3}$ on which a channel 21 is grown by LPE to a thickness of 6 μm. Within the 6 μm, the first 4 μm from the substrate is graded in carrier density by doping from $N_1 = 10^{18}$ (at the substrate interface) to $N_1 = 10^{15}$. This doping distribution results in an index profile shown graphically at 23 in the Figure. The intensity distribution of the control light in the channel is also shown graphically at 25. This complementary profile enhances faster responses to the control light since all the guide profiles reach cutoff simultaneously. The recovery time is also improved and experimental results identical to FIGS. 6a and 6b were achieved without the need of Au doping. Computer calculation of the waveguide behaviour with complementary doping indicates sub 100 ps recovery times.

The invention has been thoroughly described thus far. However, it should be noted that the lack of resonator structure, sharp excitonic nonlinearities (when compared to GaAs based MQW's) and outstanding temperature stability resulted in a very stable operation regime up to 76 MHz (limited by the equipment used and not by the modulators of the invention) and down to a few pulses per second.

Figure 8:
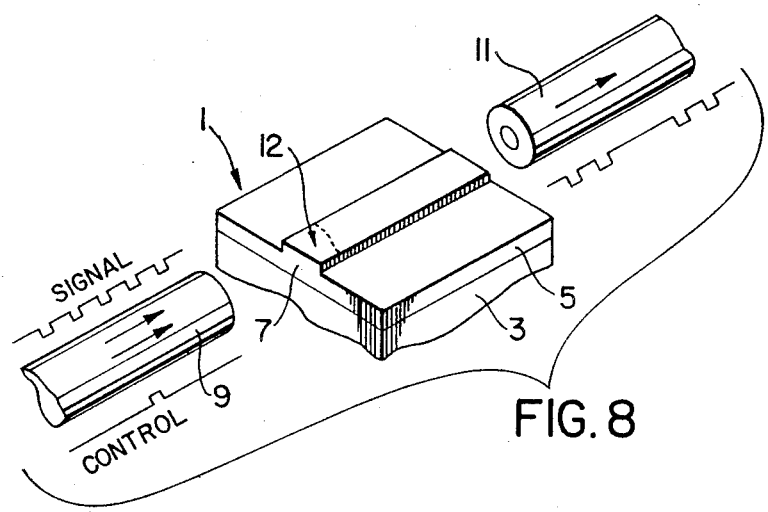
FIG. 8 is a schematic illustration of an all optical modulator according to still another embodiment of the present invention.

The three fiber implementation is close in operation to what could be called an "optical transistor", since only 10–20 mW peak intensity is required to control near 100 mW of guided light. FIG. 8 shows another embodiment which adapts a two-port geometry. In the Figure, like numerals are used for like elements shown in FIG. 1. The control light having a shorter wavelength is carried by the input fiber 9. The interaction region 12 is moved close to the coupling region since the input fiber 9 now multiplex both the signal and control light pulses. The Figure includes pulse forms of which the output pulses indicate modulation by the control pulse by way of the absence of a pulse. This is useful for remote operation by eliminating the need for one fiber and still maintain independence between "control" and "controlled" light signals.

The required switching energy is of the order of a few one-hundred picojoules and this was further reduced by using a step guide region near cutoff as in the electrooptic modulator geometry.

Figure 9:
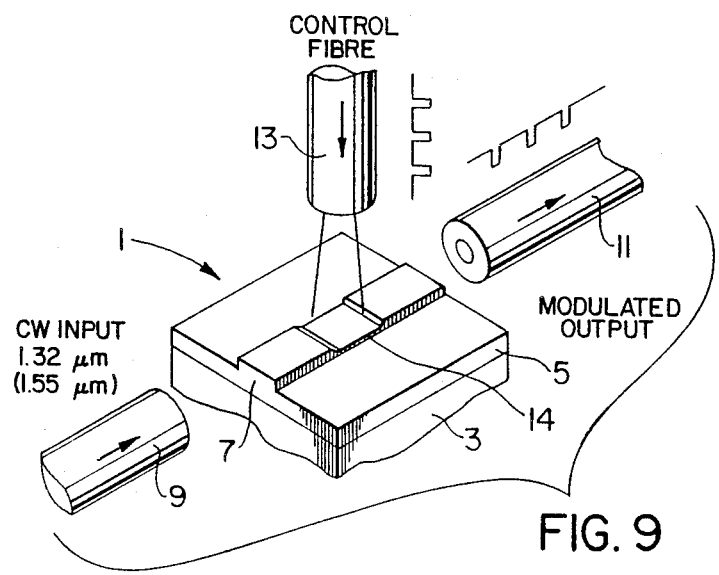
FIG. 9 is a schematic illustration of an all optical modulator according to a further embodiment of the present invention.

FIG. 9 shows such an embodiment to achieve a reduction in driving energy. As in FIG. 8, similar numerals are used in the Figure which also indicates a small region 14 of the channel. The region 14 is already near cutoff in the ridge waveguide because of its thinness.

The potential for high speed operation is also evident. These results are compatible with presently available semiconductor sources. This modulator is basically a three port device and of a geometry suitable for use as a logic gate. As disclosed in the aforementioned inventor's U.S. Pat. No. 4,776,458, once the basic modulation functions are achieved, it is possible to obtain all the usual logic gates by using crossed channel guides. Furthermore, many other nonlinear materials are also applicable to these geometries (e.g. GaAs, InSb, liquid crystals, MQW), each with some advantages in certain aspects of operation parameters.

It is recognized that an integrated optical structure having more than one modulator would have wide applications and would be more adaptable than a system which use bulk optics, electronic elements etc. It is possible to conceive a three dimensional structure by using silicon nitride as control optics over a $SiO_2$ buffer layer which is in turn laid over the channel waveguides. However because of large differences in thermal properties between silicon nitride, silicon, and $SiO_2$, it is difficult to obtain stable performances over a typical temperature of range of −40° to 100° C. It is believed that a planar approach is better suited for the electronics industry and for thermal stability.

Figure 10A:
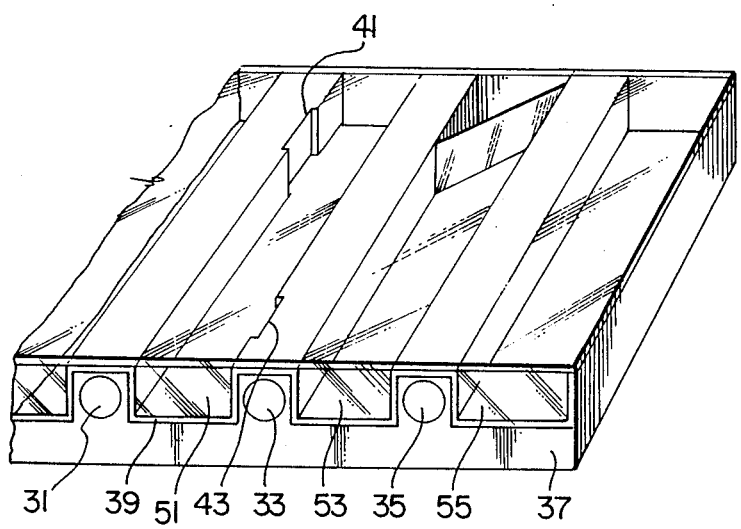
FIGS. 10a and b are schematic illustrations of the monolithic integrated modulators.
Figure 10B:
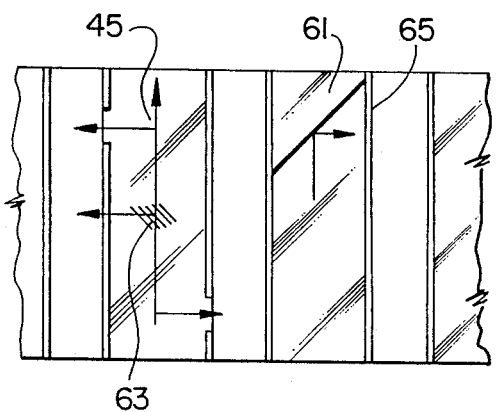

According to a further embodiment of the present invention, a planar optical modulator structure is shown in FIGS. 10a and 10b. In the figures an array of ridged channels 31, 33 and 35 is provided on a substrate 37 forming a plurality of channel waveguides. The channels and the substrate are made of silicon which has been doped differently. A $SiO_2$ buffer layer 39 is grown on the channels and the substrate by oxidation.

Figure 11A:
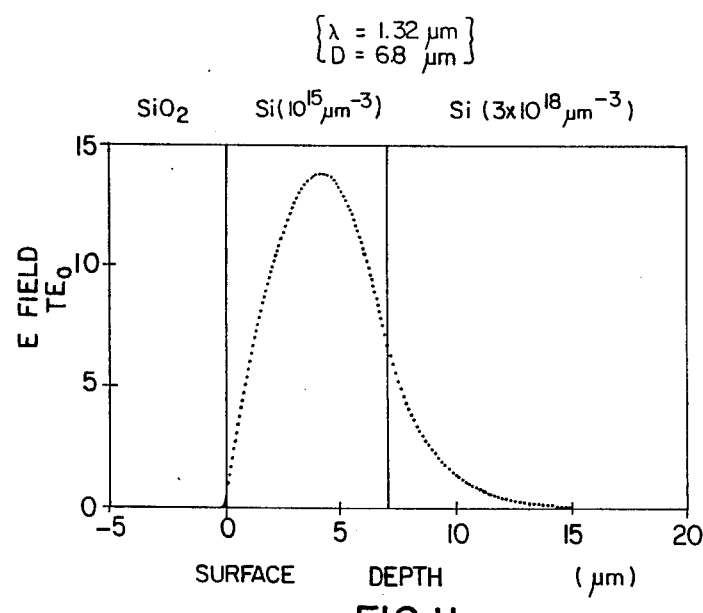
FIGS. 11a and b are the field profile of the TE$_o$ guided mode in the silicon waveguide at $\lambda = 1.32$ $\mu$m.
Figure 11B:
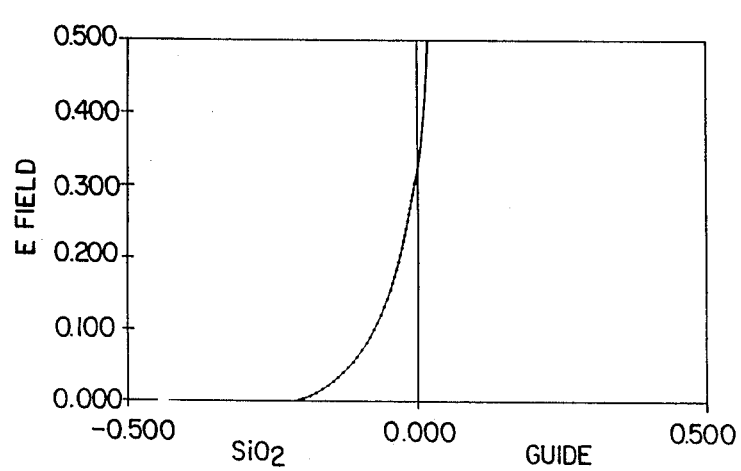

It is possible to take into account this loss of silicon guide material by building the initial array slightly larger than dictated by single mode operation for a given substrate doping. By an appropriate choice of dopants, diffusion can also be taken into account in the case of high water vapour pressure oxidation at 1000° C. for a few hours. Another technique is conformal chemical vapour deposition of the oxide followed by a densification process. Unlike regular sputtering deposition of the $SiO_2$ layer the resultant thickness is uniform, even on the side walls, without shadowing effects or pinholes. Since silicon has a high refractive index the guided mode at 1.32 $\mu$m is not perturbed by this buffer layer. This can be observed in FIGS. 11a and 11b where the guided mode electric field is plotted for a typical silicon waveguide. There is very little amplitude at the $SiO_2$ silicon interface as seen on the left hand side of the graph in FIG. 11a.

The needed interaction windows 41 and 43 for the cutoff modulator are etched with an HF solution that will attack the $SiO_2$ but not the silicon. This "window" allows the control light to be absorbed by the silicon without such deviation means as total internal reflection holographic or FIB (focussed ion beam) induced gratings, which will be discussed below. The windows simply drain light by evanescent field 45 coupling in silicon. Silicon absorbs effectively the control light and the remaining $SiO_2$ layer thickness and window length can be used to effectively control the amount of control impinging light on the silicon guide. The masking is done by conventional lithographic techniques. The side of the waveguide and not the top is used in this embodiment for the interaction windows. This will allow the use of arrays in a manner similar to mask design for gate arrays ASICs (application specific ICs) for optical circuitry.

The optical waveguides for the control light are then molded in between the silicon waveguides. The material is high index polyimide as presently used in conventional IC technology. It is well behaved on silicon and avoids the thermal and stress induced scattering problems found in silicon nitride. The material is simply spinned on the array. It can be etched back to the level of the silicon by standard differential techniques or simply pressed in shape by a $SiO_2$ cover layer for quick testing. For the initial tests a simple microscope cover slide is adequate. In real applications an overlayer of $SiO_2$ is sputtered on after the leveling etch process. The resultant structure is planar, unlike most approaches considered up to now, and is mandatory for integration with electronic circuitry. Furthermore a better heat flow results from this configuration than what is possible with a hybrid three dimensional approach with resultant heat stresses due to geometrical inhomogeneities.

FIG. 10b also shows some ways of light deviations for the control light. The total internal reflection at 61 creates 100% deviation while holographic or FIB generated deviation allows a controlled amount of light incident on the silicon guides, due to their controlled reflectivity. Since the deflected light is incident in a perpendicular direction to the wall there is no need to etch a window to allow the interaction to take place, it will be coupled nicely to the silicon guide. Similarly the complete deflection, by total internal reflection 61 in FIG. 10b, will effectively terminate all the control light in the silicon waveguide. In particular the FIB written grating method eliminates two process steps (needed in the window method).

Figure 12:
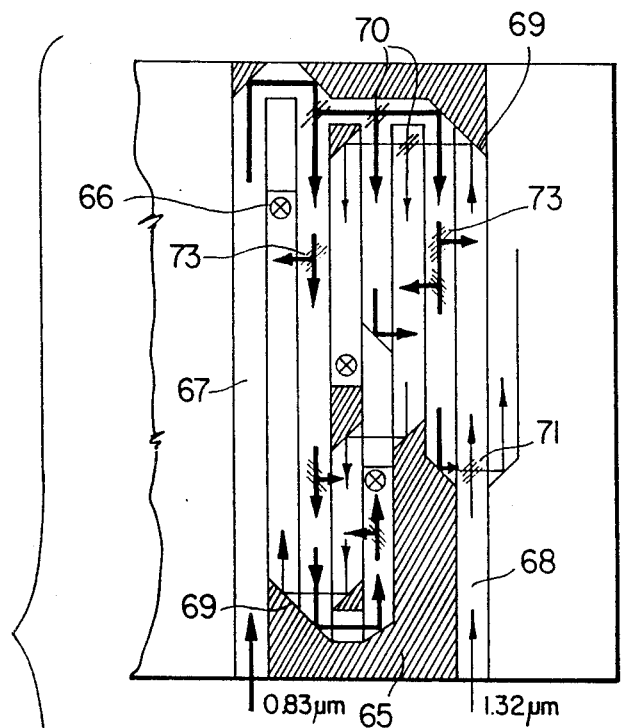
FIG. 12 is a schematic representation of a fully planar monolithic optical integrated circuit.

Finally, as depicted in FIG. 12, a complete monolithic and planar integrated optical circuit or system can be demonstrated using concepts similar to application specific integrated circuits (ASIC) in conventional electronics. In ASIC technology an array of identical transistors is first built on the wafer. Because they are all identical the net overall cost for the master chips is quite low. It is only at the last few mask steps that the customer specifies the interconnections between the various elements and functional cells. Thus the only specificity of the particular IC considered is in the interconnections and thus its overall function. The major portion and manufacturing process is completely identical between all of them even though their functions and application are quite different. Thus the name ASIC. It is this approach that is presented here in all optical and planar context. The resultant optical chip is thus fully compatible with conventional silicon electronics should there be a need to incorporate electronic functions to interface with the outside. FIG. 12 is a top view of an array of silicon and polyimide waveguides similar to FIGS. 10a and 10b. Initially both the silicon and polyimide waveguides run the full length of the wafer. The desired pattern for both the silicon and polyimide waveguides will determine their interconnections and use. They are etched using conventional lithography and the polyimide is spun on the troughs left by the etch process. After planarisation, the FIB is used to write the required grating in their respective places such as 68, 70. In the figure, shaded areas, e.g. 65, are etched regions and photo-detectors are provided at the ends of channels, such as 66. Polyimide control guides 67, transmitting control light of e.g. 0.83 μm are shown by held arrows and silicon waveguides 68 transmitting signal light of e.g. 1.32 μm by these arrows. Total internal reflections and half mirrors for the control light and signal light are indicated at location, e.g. 69 and 70. A splitter gratings in silicon is at 71 and interaction/deflection gratings are for example at 73.

Let's follow the 1.32 μm beam along its path in FIG. 12. The light is initially coupled in the system at the lower right edge, travelling in the "upward" direction. It first encounters an FIB written controllable splitter grating 70 that, under the control of 0.83 μm light from the polyimide waveguides on its left, will deflect the 1.32 μm on to another circuit or in the presently considered circuit. On reaching the top portion the 1.32 μm signal is divided in two portions by the splitting grating and two total internal reflection edges. Light at 1.32 μm can travel through the polyimide sections without interaction with the 0.83 μm light and little diffraction losses since the spacing between the guides is of the order of 10 μm or so. Should losses be a problem the total internal reflection edge 71 may be etched concave in order to slightly focus the light beam. The two 1.32 μm guided beams then encounter several interaction regions to effect the desired logic functions until they are absorbed in the readout and monitoring photodiodes 66 or simply coupled out to an output optical fiber. The control light follows a similar path, keeping in mind that unlike the 1.32 μm that can travel through the polyimide waveguides without interaction the 0.83 μm light cannot go through the silicon guides. Therefore extra care is needed to map the required traces to complete the circuit topology. The 0.83 μm light is injected at the lower left in FIG. 12 and, on reaching the double total internal reflectors is split in three parts to travel to various reflection gratings and modulate the guided 1.32 μm beams. The gray areas in FIG. 12 are bare silicon from the substrate and thus can be used to place conventional microelectronic circuits such as amplifiers for the various photodetectors in the optical layout. It is then possible to regenerate light signals by detecting the modulated 1.32 μm beams and drive a diole laser at 0.83 μm edge coupled or grown by GaAs on silicon technology on the film leading to an adjacent optical logic circuit thus realising very complex logic functions and solving amplification and fanout problems. This is not shown in FIG. 12 for simplicity and clarity.

Using such a monolithic, planar optical ASIC approach very powerful circuits can be achieved from a standard set of waveguide structures. The planar geometry assures compatibility with conventional electronics should hybrid optoelectronic functions be desired on the same substrate as well as optimising heat flow and material problems in the structure.

I claim:
1. A planar optical modulator structure comprising:
a plurality of channel waveguides having a substrate and a plurality of channels provided thereon,
each of the said plurality of channels having the refractive index higher than that of the said substrate for transmitting therethrough under a guiding condition a beam of light having the wavelength longer than the bandgap energy of the said channel and having a buffer layer thereon,
a plurality of input fiber optics optically coupled to the said plurality of channels for sending the beams of light thereinto,
a plurality of output fiber optics optically coupled to the said channels for receiving the said beams of light therefrom, and
a plurality of control means, each made of a plastic material having a higher refractive index than that of the buffer layer and positioned between the said channels, and
the said control means for carrying beams of control light therethrough, each having the wavelength shorter than the said bandgap energy, in that
light deviation means are provided in the control means to direct a predetermined amount of the said beams of control light perpendicularly to the said plurality of channels through the said buffer layer, so that each beam of control light lowers the effective refractive index of each channel to a cutoff level to disturb the said guiding condition.

2. The planar optical modulator structure, according to claim 1, wherein:
the said light deviation means is selected from total internal reflection means and gratings.

3. The planar optical modulator structure according to claim 2 wherein the said substrate and the said channels are made of an optically nonlinear material but are appropriately doped with dopants to satisfy the said guiding condition of the said channel waveguides.

4. The planar optical modulator structure according to claim 3 wherein the said optically nonlinear material is silicon and the said substrate and the said channels are doped with a dopant at different levels.

5. The planar optical modulator according to claim 4 wherein the said dopant is an element selected from the group consisting of n-type dopants of P, As and Sb and p-type of B.

6. The planar optical modulator structure, according to claim 1 wherein:
the said light deviation means is evanescence of the beam of control light transmitting through the control means, and
reaction windows are made in the buffer layer between the said plurality of control means and the said plurality of channels to optically couple therebetween for sending a part of the said beam of control light into the said channel.

7. The planar optical modulator structure according to claim 6 wherein the said substrate and the said channels are made of an optically nonlinear material but are appropriately doped with dopants to satisfy the said guiding condition of the said channel waveguides.

8. The planar optical modulator structure according to claim 7 wherein the said optically nonlinear material is silicon and the said substrate and the said channels are doped with a dopant at different levels.

9. The planar optical modulator according to claim 8 wherein the said dopant is an element selected from the group consisting of n-type dopants of P, As and Sb and p-type of B.

* * * * *